Patented Dec. 27, 1949

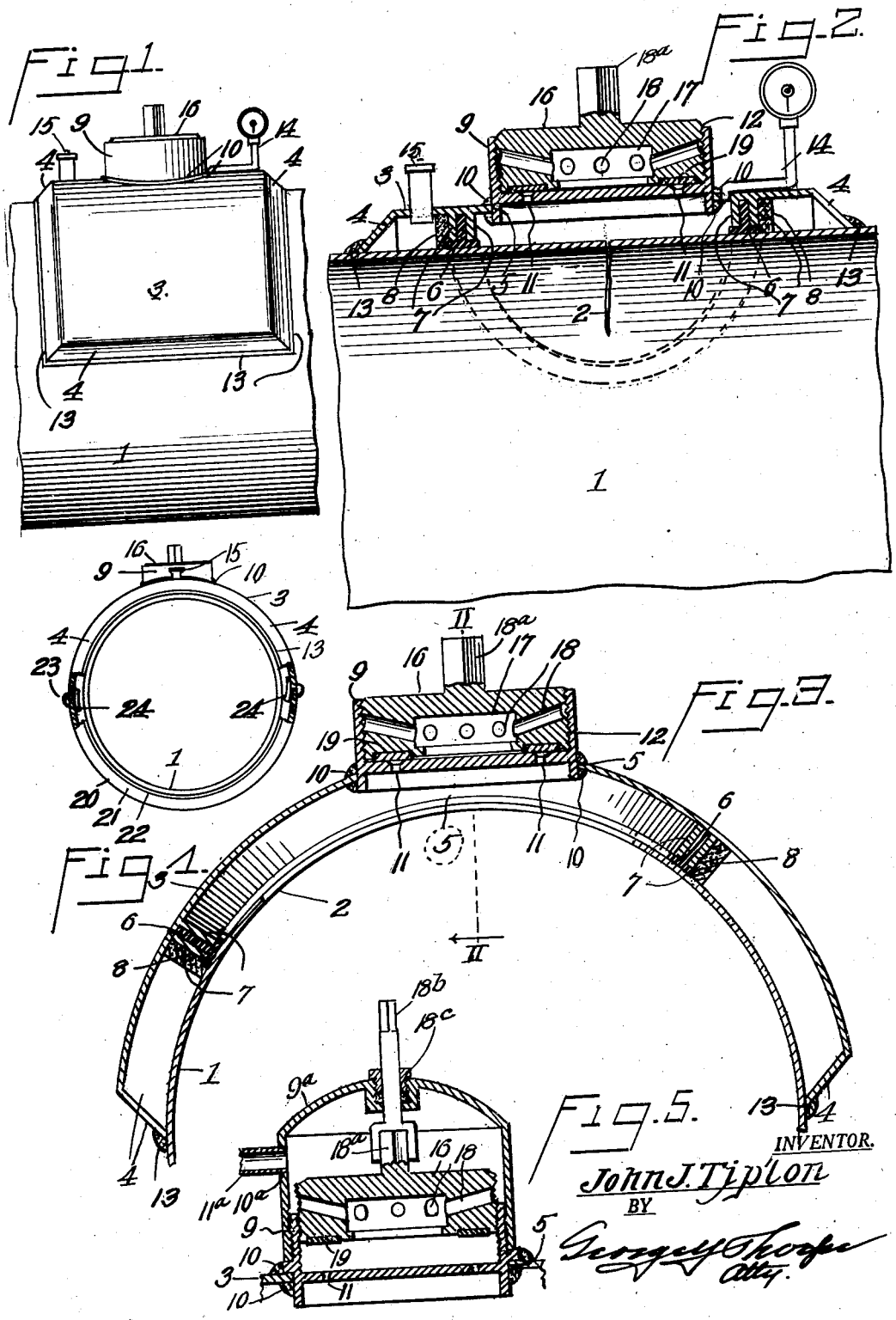

2,492,507

UNITED STATES PATENT OFFICE 2,492,507

HIGH-PRESSURE PIPE PATCH

John J. Tipton, Paola, Kans.

Application October 24, 1945, Serial No. 624,187

5 Claims. (Cl. 138—99)

1

This invention relates to equipment for the repair of leaks in high pressure gas and oil lines without cutting off the flow through the line. Heretofore no provision has ever been made to accomplish such purpose as far as applicant is informed, and to accomplish it is a great desideratum as it avoids the stoppage of service to industrial and household consumers, and such stoppage is especially disturbing in the winter season to those depending on its use for cooking and heating.

My object is not only to provide a leak-proof patch for a leaking pipe in a field or other high-pressure line, but to incidentally strengthen the pipe, and where it rests on soft ground, stiffen the line as a guard against sagging and perhaps springing a leak from such cause.

With the objects set forth in view, the invention consists in certain novel and useful features of construction and organization of parts as hereinafter described and claimed; and in order that it may be fully understood, reference is to be had to the accompanying drawings, in which:

Figure 1 is a fragmentary elevational view of a pipe equipped with a leak-proof attachment embodying the invention.

Figure 2 is an enlarged fragmental longitudinal section of the pipe and leak-proof patch equipment as shown by Figure 1, the section being on the line II—II of Figure 3.

Figure 3 is a fragmental central cross section, on the same scale as Figure 2.

Figure 4 is an end view on a reduced scale of the pipe with the construction as shown in the preceding views slightly modified at the side edges of the "patch" and equipped with a reinforcing member for stiffening the pipe line at the junction of the pipe with abutting pipes of the line.

Figure 5 is a section taken on the same line as Figure 2 but with the cup provided with a hood, provided with a wrench for the adjustment of the screw plug, and with a pipe for conducting fluid to a safe point for discharge.

Referring now to the drawing in detail, 1 is a pipe of a high-pressure line for gas or oil, and 2 represents a crack or other leak point in the pipe to be closed to the escape of fluid or to be utilized for supplying to a branch line; and to accomplish either purpose the following equipment is employed: A substantially-semi-cylindrical member 3 of size and form to span the leak point, is adapted to be fitted on the pipe, and has inturned margins 4 to contact the pipe. It has an opening 5 and at its inner side has an annular

2 gasket 6 inclosing the said opening and dividing the space between the pipe and member into an inner chamber and an outer chamber. The gasket is T-shaped in cross section and its stem is fitted tightly between a pair of continuous internal ribs 7 of the member; the head portion being engaged by the inner edges of said ribs and adapted to be clamped by the latter upon the pipe.

The patch member 3 is equipped with an asbestos band 8 fitted on the outer rib 7, and is offset to accommodate the outer edge of the head of the gasket as a protection for the latter against deterioration from heat, especially against heat developed when the member is welded to the pipe, as hereinafter explained. The member 3 is provided externally with a cup 9 fitted in the opening 5, and said cup constitutes an integral part of the member as it is permanently secured thereto, preferably by welds 10 engaging the cup both internally and externally of the member.

The cup has a circular series of bottom perforations 11, through which gas or oil escaping from the pipe 1, at the leak-point thereof, may enter the cup when the member is fitted to the pipe. As more or less danger is entailed in repairing the pipe by application thereto with gas passing through the pipe, a hood 9a may be employed to inclose the cup and is provided with an opening 10a in which is secured a pipe 11a, whereby gas passing through the cup into the hood, is discharged into the atmosphere at a point relatively remote from the member to guard against the chance of explosion in the vicinity of the patch-applying operatives.

As shown the hood is detachable from the cup, being screwed thereon as shown by Figure 5. Within the hood is a screw plug 16, which initially is screwed partway into the cup. The plug has a bottom recess 17 and passages 18 running from the recess to the perimeter; and also has a square stem or handle 18a for detachable engagement by a socket wrench 18b extending into the hood through a packing gland 18c secured in the top of the hood. By rotation of the wrench, the plug may be turned to move downward from the position shown by Figure 5 to the position shown by Figures 2 and 3. When in the position shown by Figure 5, the passages 18 establish communication between the cup and the hood, and the plug forms no impediment to the escape of gas from the pipe. When the arrangement is as described the marginal edges 4 of the member 3 are welded and as such operation is completed, the wrench is manipulated to screw the plug down until arrested by the bottom of the cup and the passages 18 are closed by the wall of the cup and thus offer an impediment to the escape of fluid from the leak-point of the pipe. To insure a complete and dependable arrest of the fluid, the plug is equipped with a lead gasket 19 of ring form to close the bottom perforations of the cup, and to minimize wear on the said gasket as the plug is turned, the upper ends of said perforations are flared or countersunk.

The member 3 is equipped with a pressure gage 14 and a pressure relief valve 15, the former communicating with the interior space surrounded by the gasket 6, and the valve with the space exterior to the said gasket. When the member is first fitted to the leaking pipe, it is firmly clamped by any suitable means in place. The escape of fluid is then cut off as explained, and if the gage indicates an undesirable build-up of pressure because the cup perforations are not sufficiently numerous or large, the member will be replaced with one of greater escape capacity.

When assured that a member is of proper escape capacity, fluid is permitted to escape and the margins of the member welded in place. The welding operation generates heat and expansion of air in the chamber between the gasket 6 and the margins of the member, which results in an air expansion which may be sufficiently great to impair the marginal weld. To guard against such result the pressure relief valve is employed.

In applications where the condition of the ground is such as to afford an unreliable support under a pipe that has sprung a leak and is repaired by the patch member described, it is desirable to stiffen the line by providing a housing for the leaking area overlying the unfirm ground.

To accomplish this, a second semi-cylindrical member 20 (Figure 4), is disposed under the pipe and welded at its side margins to the side margins of member 3, the end margins of member 20 being sloped to contact with the pipe as at 21, and welded thereto as at 22.

Where a pipe is to be completely housed around the broken or defective area as suggested, the lower or side margins of member 3, are preferably not sloped and are adapted to squarely abut the similar opposing or upper edges of member 20, and be welded thereto as shown at 23, and in this case to facilitate the proper adjustment of the two members in abutting relation, one member is provided with a strap or straps 24 of slightly curved form to guide the member 20 in abutting relation to member 3. The welding of the two members together and the welding of the end margins of member 20 to the pipe, is to reinforce the welds 13 uniting the member 3 to the pipe, which a tendency of the pipe to sag, might crack or weaken.

In the operation of welding the member 3 when high-pressure gas particularly, is flowing through the line, electric arc welding is employed as it minimizes the danger of an explosion.

From the above description considered in conjunction with the drawing, it will be apparent that I have produced a repair patch equipment of simple character possessing the advantages desirable for repairing defective pipes in high-pressure lines without interfering with continued flow therethrough, as set forth in the statement of the objects of the invention, and while I have disclosed a practical construction, it is obvious that it may be modified without departure from the spirit and scope of the appended claims.

I claim:

1. A repair patch for a leaking pipe, comprising a member fitting upon and secured to the pipe around the leak point thereof and providing a chamber between it and the pipe, a gasket sealing the joint between said member and pipe, and an outlet opening in communication with the leaking area of the pipe, a cup secured with a fluid-tight joint to the member around the said opening thereof, and open to the passage of fluid escaping from the pipe at the leak point thereof, means carried by the cup to close said cup against fluid escape, and means engaged with the cup for receiving the fluid from the cup when the cup is open.

2. A repair patch for a leaking pipe in a high-pressure pipe line, comprising a member fitting on and secured to the pipe around the leaking point thereof and providing a chamber into which the leak point opens, and having an outlet opening for said chamber accessible to fluid passing from the pipe through the leak point; the said member having annular ribs at its inner side, running around the area of the pipe containing the leak point, a compressible gasket secured between said ribs and completely surrounding the leak point of the pipe and in sealed relation with the member and the pipe, a cup fitting in said opening with a fluid-tight joint and open to receive fluid flowing out through said opening, means carried by the cup to close said cup against fluid escape, and means engaged with the cup for receiving fluid therefrom when the cup is open.

3. A repair patch for a cracked or perforated pipe of a high-pressure pipe line, comprising a member fitting upon the pipe and secured thereto at its marginal edges and spaced from the pipe within the secured edges to provide an interposed chamber, and provided with an opening, an annular gasket running around the cracked or perforated area of the pipe and in sealing engagement with the latter and said member, a threaded cup secured with a fluid-tight joint in said opening and open to the passage therethrough of fluid from the pipe, and a plug screwed into said cup and provided with a gasket closing communication between the cup and the chamber enclosed by the gasket, and provided with passages communicating at their inner ends with the chamber of the cup and closed at their outer ends by the wall of the cup.

4. A repair patch for a leaking pipe comprising a member fitted upon and secured to the pipe around the leak point thereof and providing a chamber between it and the pipe, a gasket sealing the joint between the member and pipe, and an outlet opening in communication with the leaking area of the pipe, a cup secured with a fluid-tight joint to the member around the said opening thereof, and open to the passage of fluid escaping from the pipe at the leak point thereof, a hood enclosing the cup and provided with an outlet tube, means adjustable in the cup for permitting fluid to pass from the gasket chamber into the hood or to close the flow of such fluid into the cup, and means for effecting adjustment of the first-named means from a point exterior to the hood.

5. A repair patch for a leaking pipe comprising a member fitted upon and secured to the pipe around the leak point thereof and providing a chamber between it and the pipe, a gasket sealing the joint between the member and pipe, and an outlet opening in communication with the leaking area of the pipe, a cup secured with a fluid-tight joint to the member around the said opening thereof, and open to the passage of fluid escaping from the pipe at the leak point thereof, a hood enclosing the cup and provided with an outlet tube, means adjustable in the cup for permitting fluid to pass from the gasket chamber into the hood or to close the flow of such fluid into the cup, a socket wrench extending into the hood, and a pressure release valve in communication with the chamber between the member and the pipe exterior to the gasket.

JOHN J. TIPTON.

REFERENCES CITED

The following references are of record in the file of this patent:

UNITED STATES PATENTS

| Number | Name | Date |
|---|---|---|
| 210,422 | Hayes | Dec. 3, 1878 |
| 732,400 | Dresser | June 30, 1903 |
| 763,191 | Marvin | June 21, 1904 |
| 1,510,394 | Frazier | Sept. 30, 1924 |
| 1,662,852 | De La Mare | Mar. 20, 1928 |
| 1,844,159 | Hamer | Feb. 9, 1932 |
| 2,002,577 | Ice | May 28, 1935 |
| 2,210,046 | Schubring | Aug. 6, 1940 |
| 2,286,751 | Merrill | June 16, 1942 |